United States Patent
Eppler et al.

(10) Patent No.: US 11,881,239 B1
(45) Date of Patent: Jan. 23, 2024

(54) DETERMINING FLY HEIGHT USING READBACK SIGNAL DISTORTION

(71) Applicant: Seagate Technology LLC, Fremont, CA (US)

(72) Inventors: Walter R. Eppler, Cranberry Township, PA (US); Drew M. Mader, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/733,521

(22) Filed: Apr. 29, 2022

(51) Int. Cl.
*G11B 21/02* (2006.01)
*G11B 5/60* (2006.01)

(52) U.S. Cl.
CPC ................................. *G11B 5/6029* (2013.01)

(58) Field of Classification Search
None
See application file for complete search history.

(56) References Cited

U.S. PATENT DOCUMENTS

| | | | | |
|---|---|---|---|---|
| 6,449,110 | B1* | 9/2002 | DeGroat | G11B 20/10055 |
| 7,012,772 | B1* | 3/2006 | Vis | G11B 20/10009 375/232 |
| 7,602,573 | B2 | 10/2009 | Yang | |
| 7,885,025 | B2* | 2/2011 | Eppler | G11B 20/10425 360/39 |
| 9,001,452 | B2 | 4/2015 | Daugela et al. | |
| 2023/0067909 | A1* | 3/2023 | Wang | G11B 21/106 |

* cited by examiner

*Primary Examiner* — K. Wong
(74) *Attorney, Agent, or Firm* — Mueting Raasch Group

(57) ABSTRACT

A controller extracts a distortion component of a readback signal from a magnetic read head. The distortion component may be found using a finite length Volterra series, for example. The controller estimates a clearance between the read head and a recording medium based on the distortion component. This clearance measurement can be used for closed loop fly-height control of the read head.

19 Claims, 6 Drawing Sheets

DETERMINING FLY HEIGHT USING READBACK SIGNAL DISTORTION

SUMMARY

The present disclosure is directed to determining fly height using readback signal distortion. In one embodiment a controller extracts a distortion component of a readback signal from a magnetic read head. The controller estimates a clearance between the read head and a recording medium from the distortion component. In another embodiment, data is read via a read transducer that is positioned over a magnetic disk. Three measurements from the data are calculated, including: a first measurement representative of signal amplitude based on a linear Volterra kernel; a second measurement representative of a crosstrack position of the read transducer based on a second order Volterra kernel; and a third measurement representative of fly height of the read transducer based on a normalized sum of taps of the linear Volterra kernel. The second and third measurements are used for closed-loop control of the respective crosstrack position and fly height.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
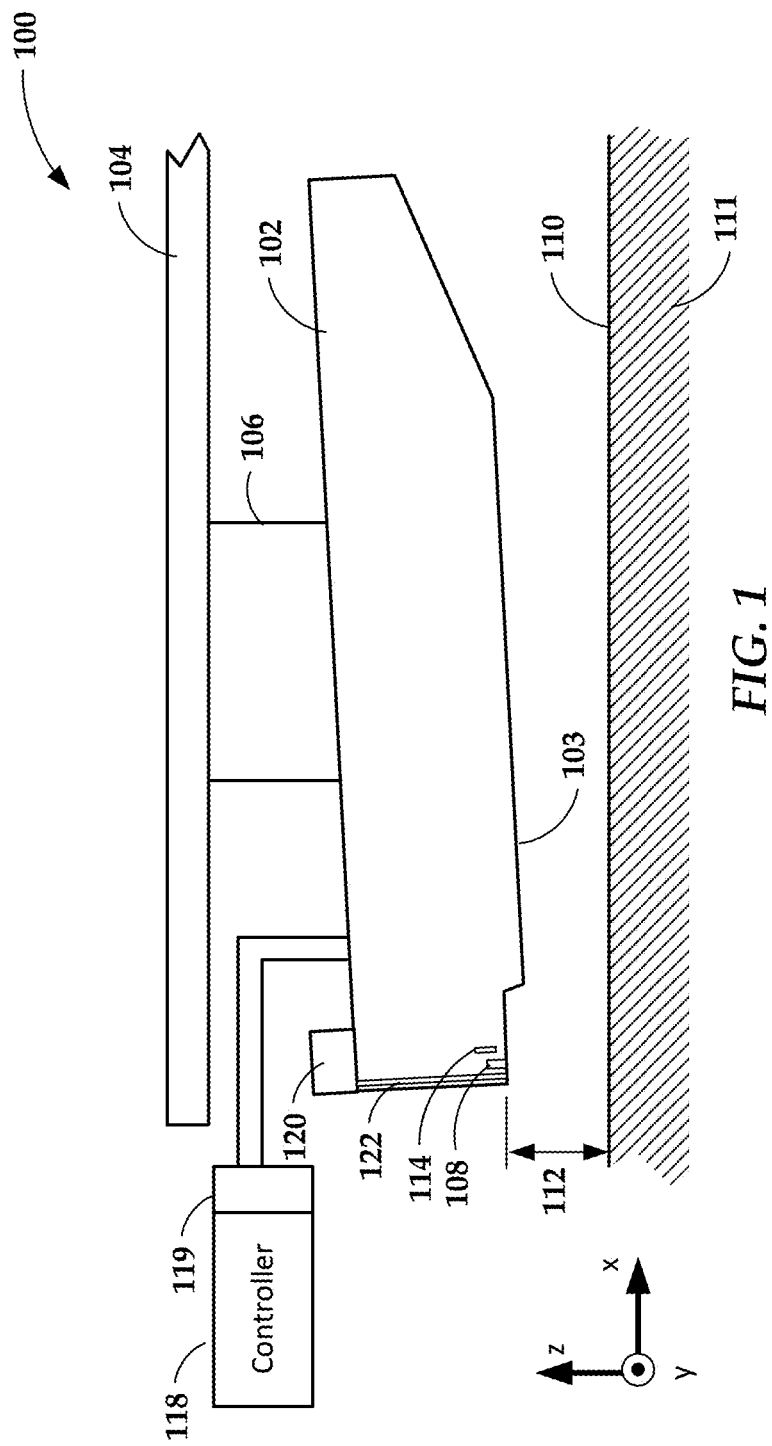
FIG. 1 is a schematic diagram of a recording head according to an example embodiment.

The present disclosure generally relates to data storage devices that utilize magnetic storage media, e.g., disks. These devices use read/write heads that float over the surface of the disk, generally separated by a thin layer of air or other gas (e.g., helium). The heads have air-bearing surfaces (ABS) that interact with the air over the spinning disk and maintain a predetermined spacing. The heads in modern disk drives often have additional features to actively control the clearance between the read and write transducers of the heads, thereby providing finer control over these spacings than can be achieved by the air bearings alone. These clearances may sometimes be referred to as fly height, head-to-media clearance, head-to-media spacing, etc.

For example, a heater can be used to vary the relative position of the slider-integrated transducer to set the operating clearance. Generally, the heater causes a local protrusion around the transducer due to thermal expansion of the surrounding material. This protrusion can be amplified and controlled by various structural features, such as a push block with a high coefficient of thermal expansion.

The operating clearance can be sensed using the frequency content of special patterns, such as a dedicated harmonic ratio test. The harmonic ratio test relies upon a fixed frequency data pattern, such as data embedded in servo sectors that are distributed around the disk surface. In such a setup, any feedback signals used to control operating clearance can only be gathered when traversing the servo sectors, which take up a small portion of the total track length. In between the servo marks are the user data which may be considered random data for purposes of clearance detection, and harmonic ratio testing does not work with random data. Furthermore, due to the weak sensitivity of the harmonic ratio test, multiple servo sectors may need to be measured to acquire adequate gauge capability (small enough variance) to the measurement.

The servo sectors are used, among other things, to measure relative crosstrack position of the read/write head over the data tracks so that corrections can be applied to maintain alignment with the tracks. It has been demonstrated that Volterra kernels can be used to estimate or measure the relative crosstrack position of the transducer with bandwidth at least two times greater than the convention servo tracking, e.g., using fixed frequency burst patterns in the servo sectors (see, e.g., U.S. Pat. No. 7,885,025 to Eppler et al.). Further, these estimates can be made with user/random data, allowing tracking to be monitored and adjusted between servo marks. In this disclosure, it is demonstrated that this Volterra kernel functionality can be augmented to also provide an estimate/measurement of the spacing of the reader to the magnetic data (vertical direction) with similar bandwidth increases. This measurement of reader spacing can be used to actively control fly height of the read and write transducers.

In FIG. 1, a block diagram shows an apparatus 100 using clearance control according to an example embodiment. The apparatus 100 includes a read/write head 102, which may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk.

The read/write transducers 108 typically include a magnetic write pole coupled to an electrical coil operating as a write transducer. The write transducer includes other components, including a return pole and yoke, that provide a flux closure which allows shaping and directing a magnetic field. The magnetic field is applied to the recording medium 111 moving beneath the read/write head 102 to write data. The read/write transducers 108 also include one or more read transducers, such as a magnetoresistive sensor. Such a sensor, which may include a giant magnetoresistive (GMR) stack, tunnelling magnetoresistive (TMR) stack, etc. Generally, the magnetoresistive sensor stack changes internal electrical resistance in the presence of a changing magnetic field, and therefore can detect the magnetic patterns written to the recording medium 111.

When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an ABS 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., clearance heaters) are formed in the read/write head 102. A current applied to the clearance heater 114 induces a local protrusion which varies the clearance between the read/write transducers 108 and the recording medium 111. The amount of current applied to the clearance heater 114 may vary based on which of the read/write transducers 108 are in use, and may also be adjusted to account for irregularities in the media surface 110, changes in ambient temperature, location of the read/write head 102 over the medium 111, etc. Thermal sensors (not shown) may also be included in the read/write head 102 to facilitate measuring clearances, e.g., by measuring a thermal profile as a function of heater power. However, as described herein, such sensors may not be needed to measure clearance in view of the ability to estimate clearance based on the distortion characteristics of random signals. In other configurations, the thermal sensors may provide a backup functionality, as well as being used for other measurements, e.g., thermal asperity.

The apparatus 100 includes a controller 118 coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to an interface circuit 119 that may include preamplifiers, buffers, filters, digital-to-analog converters, analog-to-digital converters, decoders, encoders, etc., that are operable to electrically couple the logic of the controller 118 to components integrated with the read/write head 102 and enable communications therebetween.

The controller 118 includes a clearance control system that contains three adaptive, seven-tap Volterra kernel estimators actively updated during a read request. The Volterra kernel estimators may be implemented via a hardware accelerator, e.g., custom designed logic circuits to perform a specific function. In this case, the logic circuits may be configured to calculate the Volterra series used in the Volterra kernel estimators. It has been shown by measuring two variables derived from the Volterra kernels, a measurement proportional to the linear Volterra kernel or the signal amplitude ($C_{linear}$) and a measurement proportional to the second order Volterra kernels ($C_{2nd\_order}$), a wide bandwidth estimation to the readers crosstrack position relative to the written data can be made.

By augmenting the two variables used in the crosstrack position estimation with a third variable ($C_{res}$) proportional to the resolution of the read sensor (the readers resolution is a monotonic function of the magnetic spacing) the system can simultaneously estimate the cross-track position and vertical position of the reader relative to the data track. The third variable used in this example is a normalized area which is the sum of the normalized seven taps from the linear Volterra kernel, as shown in Equation (1) below, where $Tap_1$-$Tap_7$ are the taps of the linear kernel, vga is the gain of the variable gain amplifier in the system. Thus, the sum of the taps is normalized by the gain of the read channel as well as the output of the center tap.

$$C_{res} = \left( \sum_{k=1}^{7} \frac{Tap_i}{10^{\frac{vga}{20*128}}} \right) / Tap_4 \quad (1)$$

Figure 2:
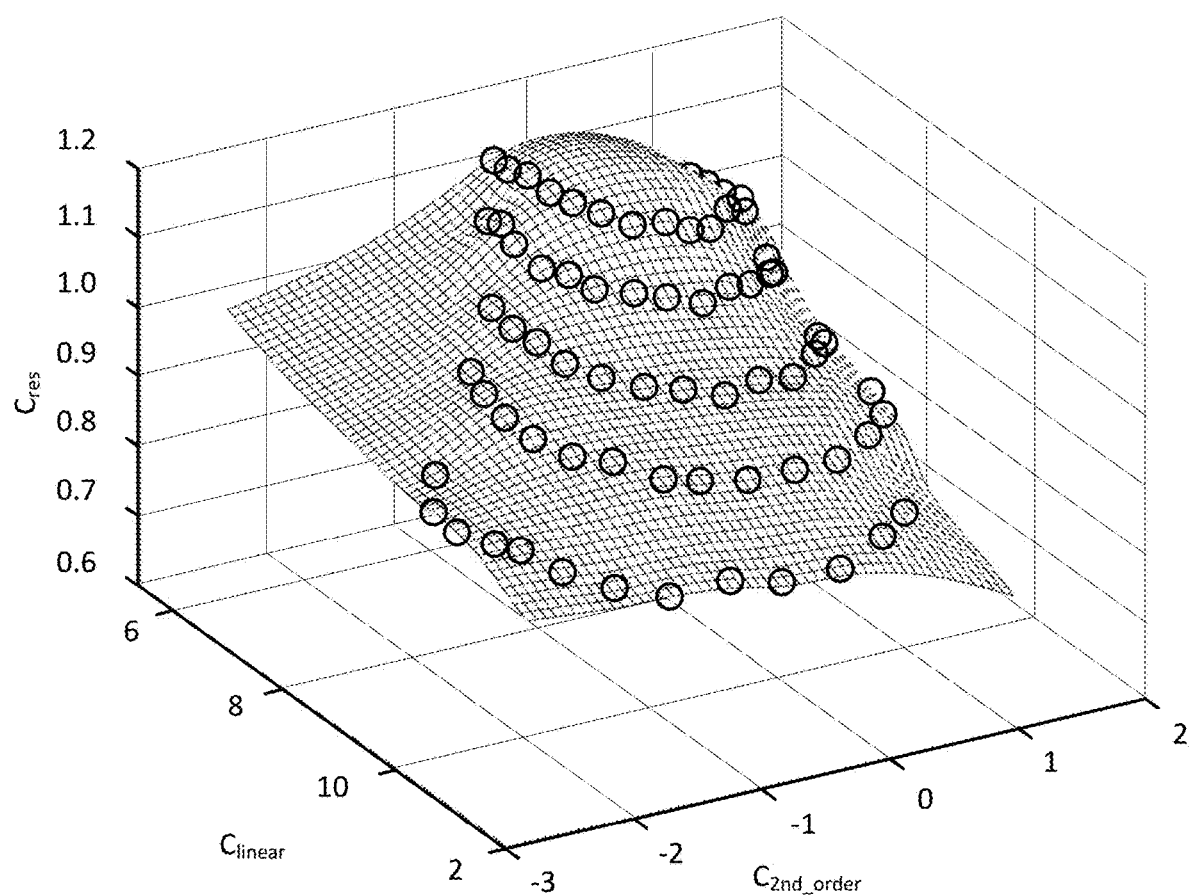
FIGS. 2 and 3 are three-dimensional plots showing data collected and processed according to an example embodiment.

As the reader position is varied relative to data track in either the cross-track direction or the vertical direction, the three variables derived from the Volterra kernel ($C_{linear}$, $C^{2nd\_order}$, $C_{res}$) will trace out a three-dimensional surface as shown in FIG. 2 over different values of clearance. In FIG. 2, a three-dimensional plot shows the values of the three derived variables during calibration sweeps for five read clearances [7, 17, 27, 37, and 47 angstroms] at 14 cross track locations [−32%, −28%, ..., +16%, +20%]. The measured values are shown in the figure as open circles, and the meshed surface is a thin plate smoothing spline surface through the measured calibration data points.

Figure 3:
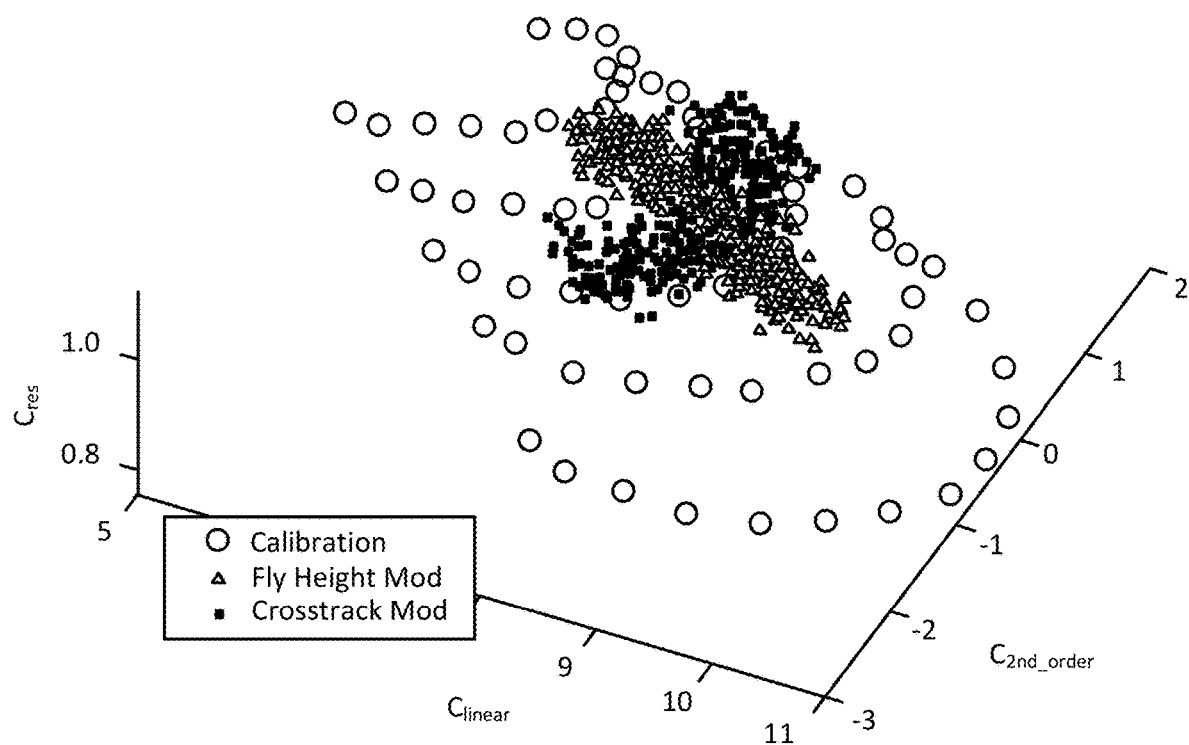

Three additional experiments were performed in a disk drive, where modulation was injected into the servo control input and/or the read heater digital-to-analog (DAC) control while reading tracks with random user data. In the first two experiments a triangle wave was injected into one input while the other was held constant, and the results are shown in the plot of FIG. 3. The raw Volterra kernel data for the modulated fly height with constant crosstrack position (zero servo offset) is shown as triangles overlayed on the calibration surface in FIG. 3. The raw Volterra kernel data for the modulated crosstrack position at a constant clearance (27 angstroms) is shown as squares overlayed on the calibration surface in FIG. 3.

When the head position is modulated in the vertical direction at constant crosstrack position, the second order kernel remains essentially constant ($C_{2nd\_order}$) and the linear kernel amplitude and normalized area vary ($C_{linear}$, $C_{res}$). Likewise, when the head position is modulated in the cross-track direction the normalized sum of the linear kernel $C_{res}$ remains essentially constant and the other kernels vary. In the demodulated waveforms, modulation was not detected in the opposite axis. This demonstrates how crosstrack offset and fly height independently can affect coordinate of a point in the ($C_{linear}$, $C_{2nd\_order}$, $C_{res}$) space.

Figure 4:
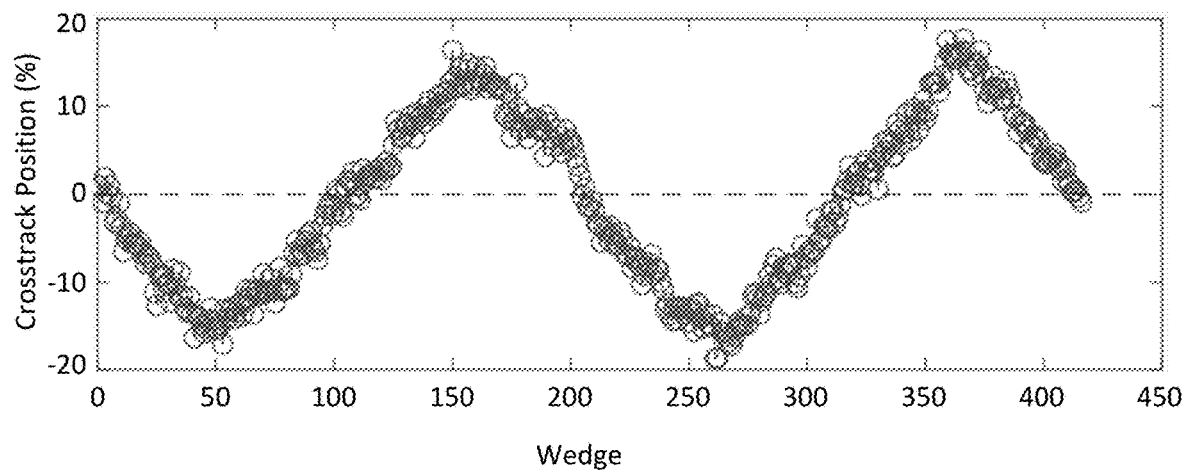
FIGS. 4 and 5 are plots showing measured crosstrack position and fly height using a processing system according to example embodiments.
Figure 5:
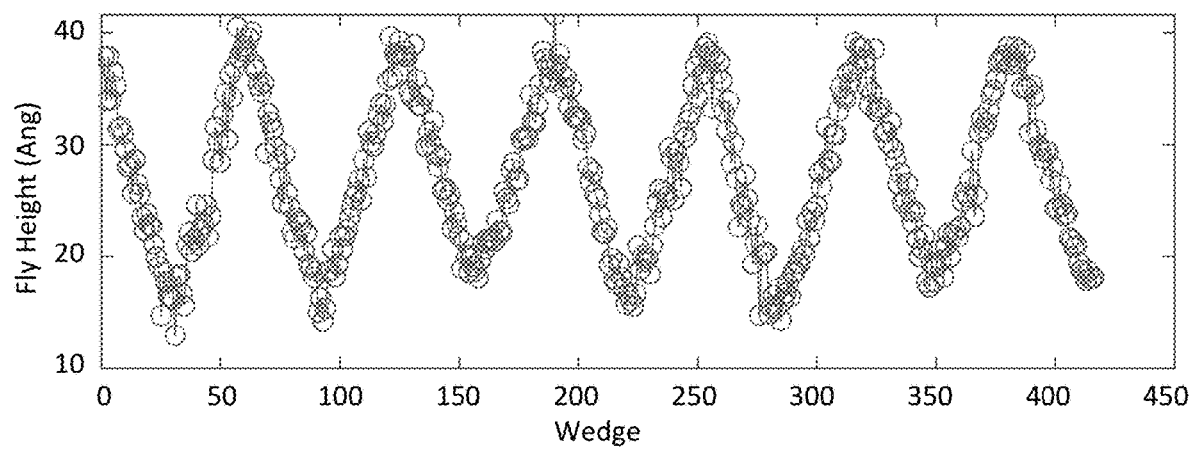

In the third experiment using the same drive, triangle waveforms of different frequency were simultaneously injected into both control inputs. The demodulated crosstrack position of the head using the Volterra kernel is shown in FIG. 4 and the demodulated fly height of the head using the Volterra kernel is shown in FIG. 5. Minimal feedthrough of either inputs is observed in the opposite axis output and the random scatter or noise variation from the triangle inputs is reasonably small demonstrating full detection of reader position in one measurement from a random data signal.

Figure 6:
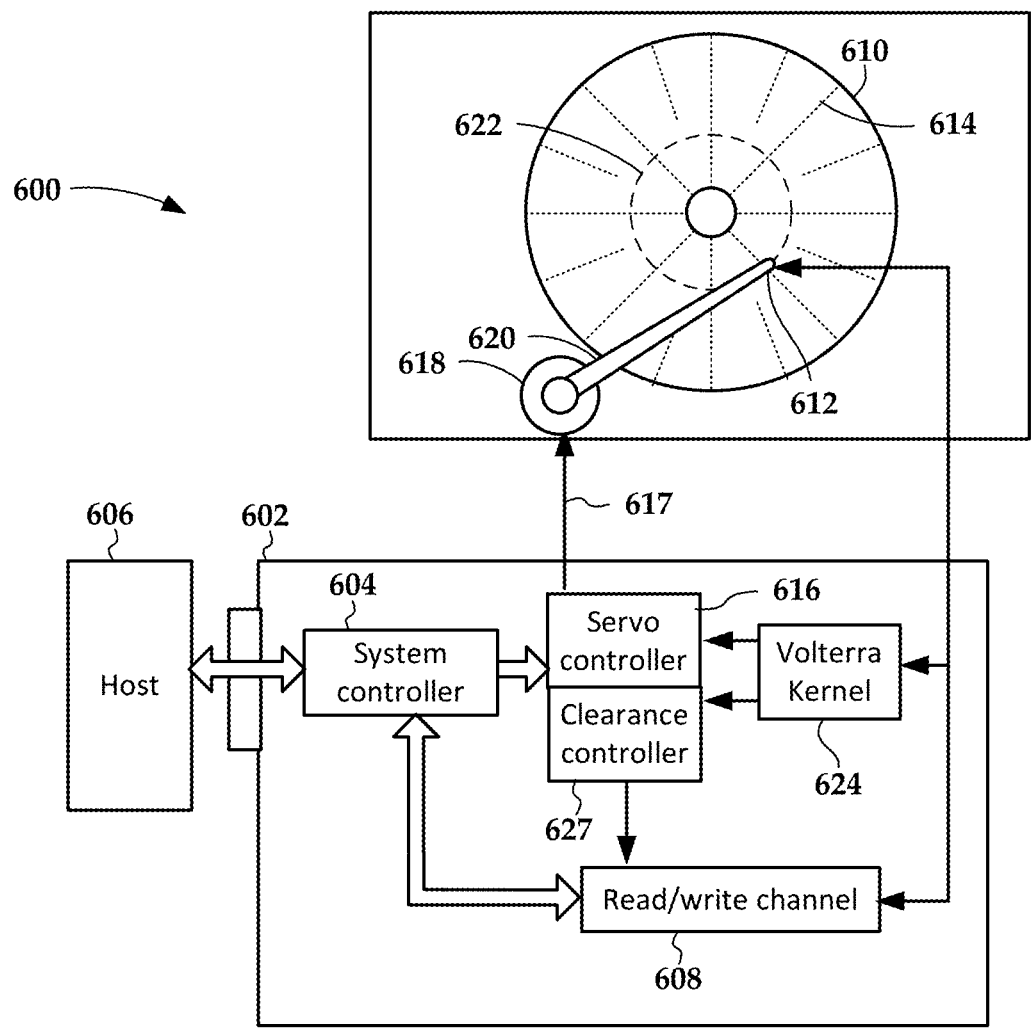
FIG. 6 is a block diagram of a data storage device according to an example embodiment.

In FIG. 6, a block diagram illustrates a data storage apparatus 600 according to an example embodiment. Control logic circuit 602 of the apparatus 600 includes a system controller 604 that processes read and write commands and associated data from a host device 606. The host device 606 may include any electronic device that can be communicatively coupled to store and retrieve data from a data storage device, e.g., a computer, peripheral card, etc. The system controller 604 is coupled to a read/write channel 608 that reads from and writes to a surface of a magnetic disk 610.

The read/write channel 608 generally converts data between the digital signals processed by the system controller 604 and the analog signals conducted through one or more read/write heads 612. For example, the read/write channel 608 converts analog signals detected from the disk to encoded user data, and converts digital data (e.g., user data received from the host device 606) to analog signals that write encoded user data to the disk. To facilitate these operations, the read/write channel 608 may include analog and digital interface circuitry such as preamplifiers, filters, decoders, digital-to-analog converters, analog-to-digital converters, timing-correction units, etc.

In addition to reading user data, the read/write channel 608 provides servo data read from servo wedges 614 on the magnetic disk 610 to a servo controller 616. The servo controller 616 uses these signals to provide a control signal 617 to a voice coil motor (VCM) 618. The VCM 618 moves (e.g., rotates) an arm 620 upon which the read/write heads 612 are mounted in response to the servo control signal 617. The servo control signal 617 may also be used to provide fine motion control, e.g., during track following, by moving microactuators (not shown) located near the read/write head 612.

Data within the servo wedges 614 is used to detect the location of a read/write head 612 relative to the magnetic disk 610. The servo controller 616 uses servo data to move the read/write head 612 to an addressed track 622 and sector on the magnetic disk 610 in response to the read/write commands (seek mode). While data is being written to and/or read from the disk 610, the servo data may also be used to maintain the read/write head 612 aligned with the track 622 (track following mode).

A clearance controller 627 includes the functionality to drive a clearance control actuator that is embedded in the read/write head 612. This can be achieved by sending signals through the read/write channel 608 which cause power to be selectively applied to a clearance actuator (e.g., heater). The clearance controller 627 determines an estimate of fly height via a Volterra kernel module 624 that calculates a finite length Volterra series that is used to determine a distortion component in a readback signal. Three different calculations may be made to jointly estimate fly height used by the clearance controller 627 and crosstrack position used by the servo controller 616.

The Volterra kernel module 624 can be configured to provide a first measurement proportional to a linear Volterra kernel, the first measurement representative of signal amplitude. The Volterra kernel module 624 provides a second measurement proportional to a second order Volterra kernel. The second measurement is representative of a crosstrack position relative to written data on the recording medium. The Volterra kernel module 624 provides a third measurement comprising a sum of a plurality of taps of the linear Volterra kernel that is normalized by a read channel gain and a center tap of the linear Volterra kernel. The Volterra kernel module 624 may be implemented using hardware acceleration, e.g., using dedicated circuits to perform the Volterra series calculations.

Figure 7:
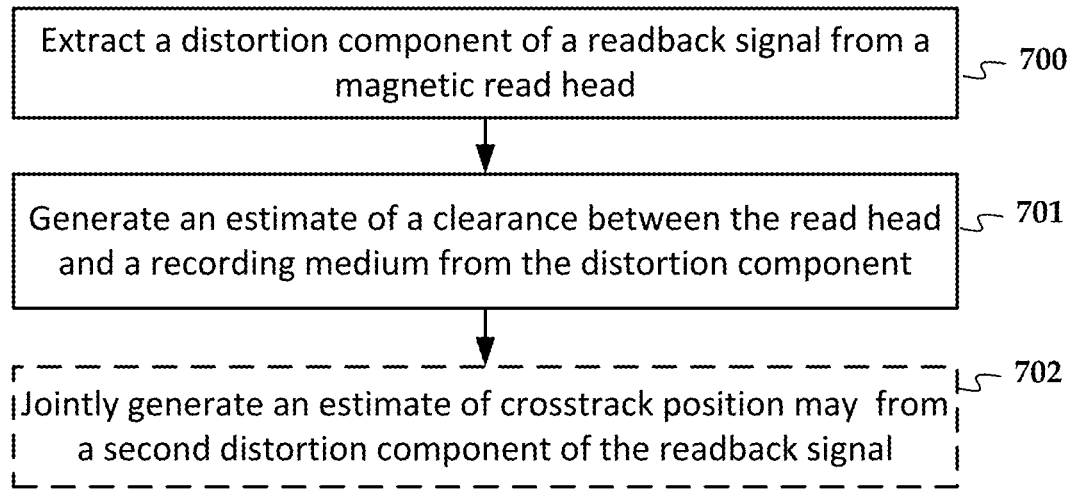
FIGS. 7 and 8 are flowcharts of methods according to example embodiments.

In FIG. 7, a flowchart shows a method according to an example embodiment. The method involves extracting 700, by a controller, a distortion component of a readback signal from a magnetic read head. An estimate of a clearance between the read head and a recording medium is generated 701 from the distortion component. An estimate of crosstrack position may be jointly generated 702 from a second distortion component of the readback signal.

Figure 8:
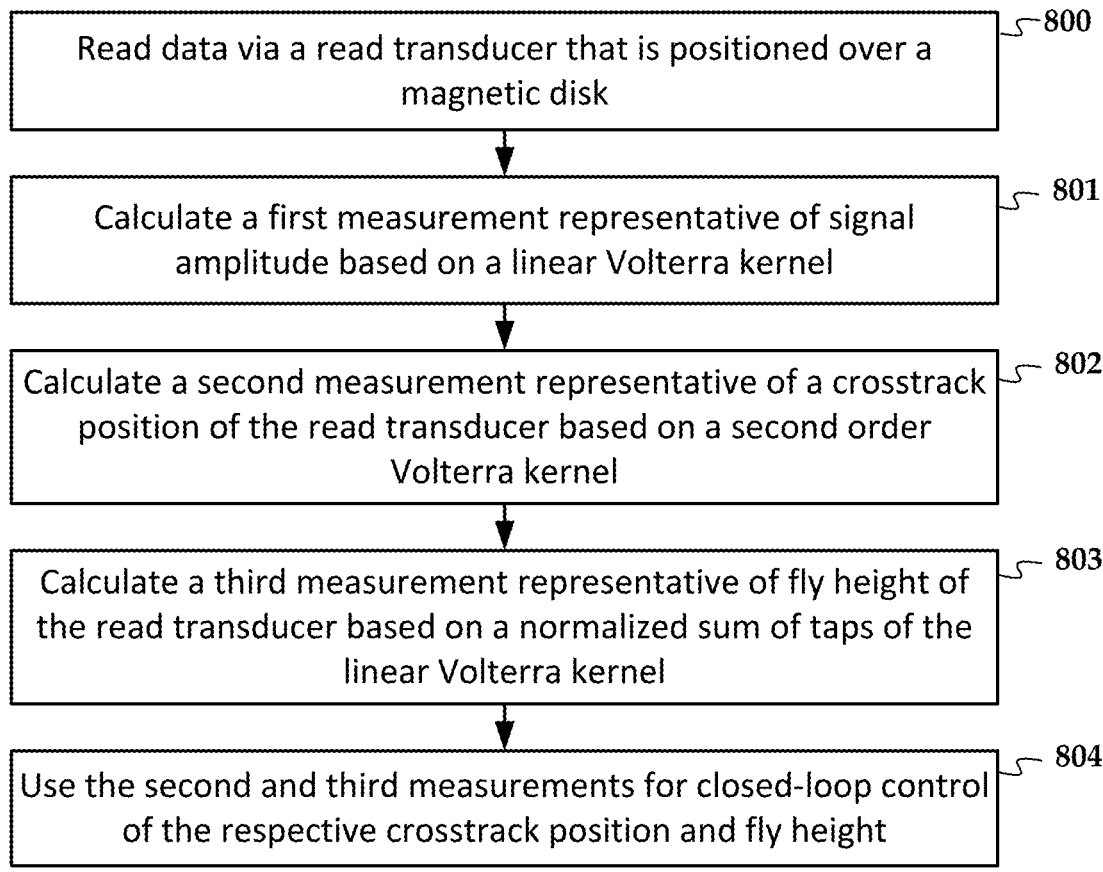

In FIG. 8, a flowchart shows another method according to an example embodiment. The method involves reading 800 data via a read transducer that is positioned over a magnetic disk. Three measurements are calculated from the data via a controller, e.g., using a linear Volterra series. The controller calculates 801 representative of signal amplitude based on a linear Volterra kernel. The controller calculates a second measurement 802 representative of a crosstrack position of the read transducer based on a second order Volterra kernel. The controller calculates a third measurement 803 representative of fly height of the read transducer based on a normalized sum of taps of the linear Volterra kernel. The controller controls 804 the crosstrack position and fly height via closed loop control based on the second and third measurements.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method comprising:
   representing a readback signal from a magnetic read head by a linear Volterra kernel; and
   generating an estimate of a clearance between the read head and a recording medium based on a sum of a plurality of taps of the linear Volterra kernel.

2. The method of claim 1, further comprising:
   controlling the clearance between the read head and the recording medium based on the estimate of the clearance.

3. The method of claim 1 wherein the sum is normalized by a read channel gain and a center tap of the linear Volterra kernel.

4. The method of claim 3, further comprising determining:
   a first measurement proportional to the linear Volterra kernel, the first measurement representative of signal amplitude;
   a second measurement proportional to a second order Volterra kernel, the second measurement representative of a crosstrack position relative to written data on the recording medium; and
   a third measurement comprising the normalized sum of the plurality of taps of the linear Volterra kernel.

5. The method of claim 4, further comprising using the second and third measurements for respective closed-loop control of the crosstrack position and the clearance.

6. The method of claim 4, wherein the third measurement is proportional to a resolution of the magnetic read head.

7. The method of claim 1, wherein the readback signal is based on reading one or more of random data and user data.

8. The method of claim 1, wherein the magnetic read head comprises a magnetoresistive sensor.

9. A disk drive apparatus comprising a controller operable to perform the method of claim 1.

10. The disk drive apparatus of claim 9 further comprising a hardware accelerator coupled to the controller for calculating a finite length Volterra series, the linear Volterra kernel based on the finite length Volterra series.

11. The disk drive apparatus of claim 9 further comprising a clearance actuator in the read head, the controller further operable to use the estimate of the clearance for closed loop control of the clearance.

12. A method, comprising:
reading data via a read transducer that is positioned over a magnetic disk;
calculating three measurements from the data comprising:
a first measurement representative of signal amplitude based on a linear Volterra kernel;
a second measurement representative of a crosstrack position of the read transducer based on a second order Volterra kernel;
a third measurement representative of fly height of the read transducer based on a normalized sum of taps of the linear Volterra kernel; and
controlling the crosstrack position and the fly height, via one or more closed-loop controllers, based on the second and third measurement.

13. The method of claim 12 wherein the first, second, and third measurements are based on a finite length Volterra series.

14. The method of claim 12, wherein the third measurement is proportional to a resolution of the read transducer.

15. The method of claim 12, wherein the data comprises one or more of random data and user data.

16. The method of claim 12, wherein the read transducer comprises a magnetoresistive sensor.

17. A disk drive apparatus comprising a controller operable to perform the method of claim 12.

18. The disk drive apparatus of claim 17, further comprising a hardware accelerator coupled to the controller for calculating a finite length Volterra series, the finite length Volterra used to calculate the first, second, and third measurements.

19. The disk drive apparatus of claim 17, further comprising a read head that includes the read transducer and a clearance actuator, wherein using the third measurement for the closed-loop control of the fly height comprises sending a signal to the clearance actuator to change the fly height based on the third measurement.

* * * * *